Sept. 22, 1959 L. J. KOCH 2,905,338
INDEXING MECHANISM
Filed Aug. 28, 1952 10 Sheets-Sheet 1

INVENTOR.
Leonard J. Koch
BY
Roland A. Anderson
Attorney

Sept. 22, 1959     L. J. KOCH     2,905,338
INDEXING MECHANISM
Filed Aug. 28, 1952     10 Sheets-Sheet 4

INVENTOR.
Leonard J. Koch
BY
Attorney

Sept. 22, 1959   L. J. KOCH   2,905,338
INDEXING MECHANISM
Filed Aug. 28, 1952   10 Sheets-Sheet 7

INVENTOR.
Leonard J. Koch
BY
Roland R. Anderson
Attorney

United States Patent Office 2,905,338
Patented Sept. 22, 1959

2,905,338

INDEXING MECHANISM

Leonard J. Koch, Elmhurst, Ill., assignor to the United States of America as represented by the United States Atomic Energy Commission Application August 28, 1952, Serial No. 306,848

8 Claims. (Cl. 214—1)

This invention relates to neutronic reactors and more particularly it pertains to a device for loading and unloading fuel elements containing material fissionable by neutrons of thermal energy.

The fuel element involved herein is an elongated body adapted to be used in a fast neutron self-sustaining chain reaction system. Such a system is set forth in the copending application of Walter H. Zinn, Serial No. 721,108, filed January 8, 1947. Since this invention is not directly concerned with the operation of the neutronic reactor, reference is made to that application. This invention is concerned with a device for inserting and withdrawing fuel elements of a modified type shown in that application. The modification involves two longitudinal ribs or fins disposed on the external surface of the fuel element.

The instant invention may be better understood by reference to the following description and the appended drawings in which.

In order to comprehend the purpose of this device it will be necessary to first describe some of the mechanical parts of a neutronic reactor together with the particular fuel element used therein. Accordingly, reference is made to Figure 1, in which an indexing mechanism, generally indicated at 50, is sustained in position by means of a support stand 52. One end of the mechanism 50 is disposed directly over a neutronic reactor, generally indicated at 54, embedded within a mass of shielding material at 56, such as concrete.

Figures 1, 2:
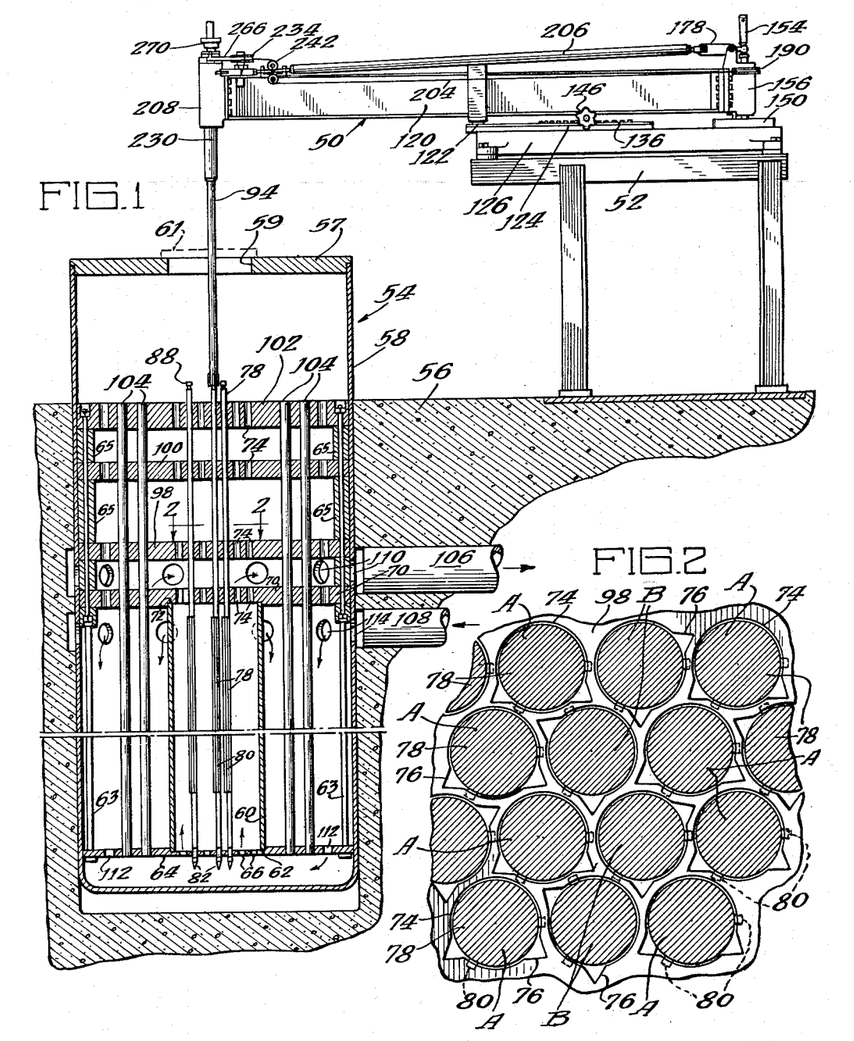
Figure 1 is a vertical sectional view, partly in elevation, showing the device attached to a neutronic reactor.
Figure 2 is an enlarged fragmentary horizontal view taken on the line 2—2 of Figure 1.

The reactor 54 is preferably cylindrical and is surrounded by a sheath 58 of material having a satisfactory combination of physical strength and corrosion resistance, such as stainless steel. The upper portion of the sheath 58 extends above the surface of the shield 56 and is provided with a cover plate 57. Centrally located in the plate 57 is a hole 59 that is covered with a lid 61 when the indexing mechanism is not being used to load or unload the reactor.

Within the reactor 54 a plurality of horizontal shield plates 64, 70, 98, 100, and 102 are disposed in spaced relationship. These plates are sustained in position by means of tie rods 63 adjacent the sheath 58 extending from the lowermost plate 64 to the uppermost plate 102. In addition a spacer 65 is disposed between the plates 70, 98, 100, and 102 at the peripheries thereof. With the exception of varying widths the spacers 65 are similar.

Figures 19, 20, 21, 22, 23, 24, 25, 26:
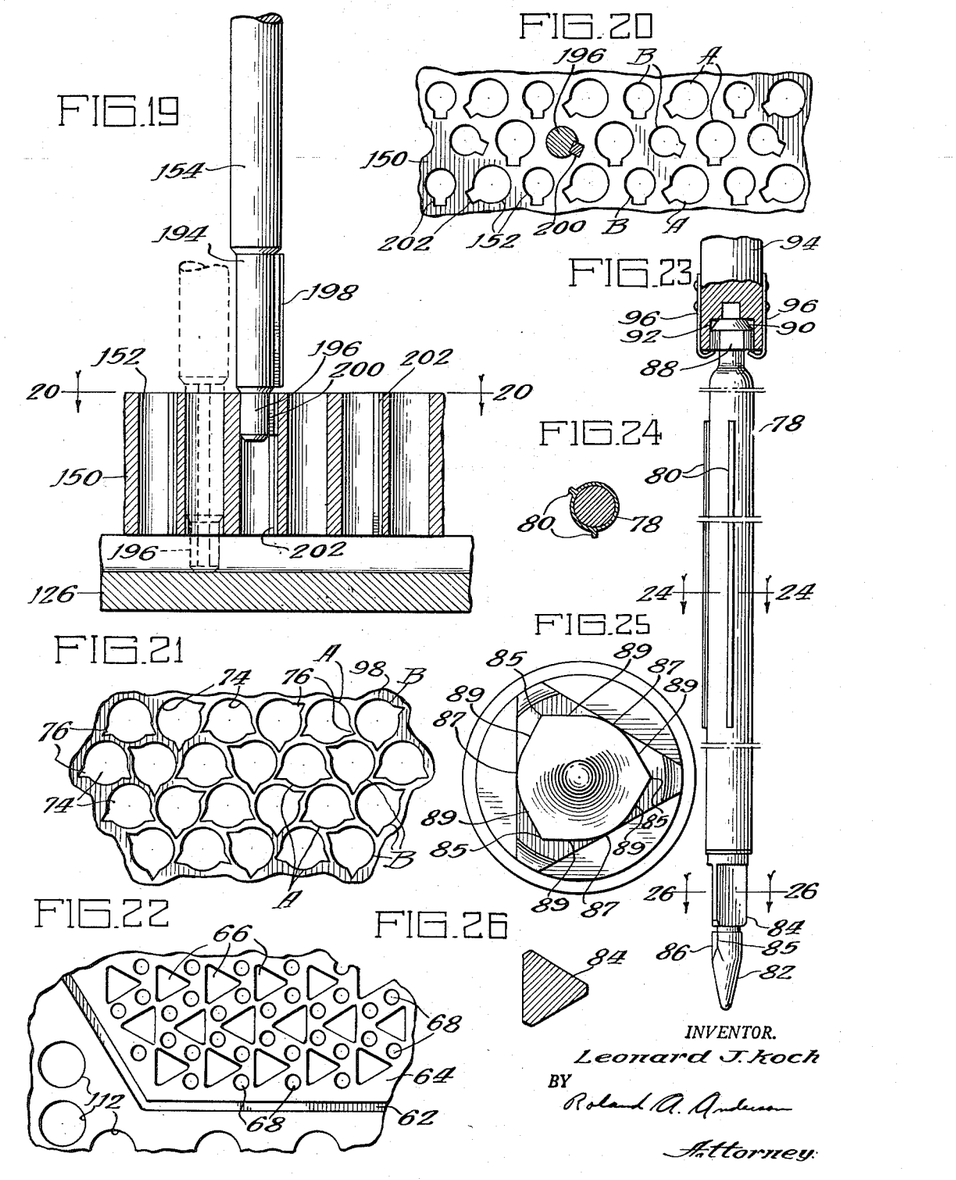
Figure 19 is a vertical sectional view of the index pin and indexing plate of Figure 5, showing the two positions of insertion of the index pin.
Figure 20 is a fragmentary plan view of the index pin and indexing plate taken on the line 20—20 of Figure 19.
Figure 21 is a fragmentary plan view of a horizontal plate in the upper portion of the reactor shown in Figure 1.
Figure 22 is a fragmentary plan view of the bottom plate within the reactor shown in Figure 1.
Figure 23 is an enlarged elevational view, partly in section, of the fuel element showing in greater detail than Figure 1 the manner in which the removal and insertion wrench is attached thereto.
Figure 24 is a horizontal section view taken on the line 24—24 of Figure 23.
Figure 25 is an enlarged end view of the bottom portion of the fuel element.
Figure 26 is an enlarged sectional view taken on the line 26—26 of Figure 23.

At the center of the reactor 54 a plurality of vertical fuel elements 78 extend between the lower plate 64 and the upper plate 102. The elements 78 are slidably disposed through apertures 66 (in the lower plate 64) and apertures 74 (in the plates 70, 98, 100 and 102). Apertures 74 in the latter plates are similar (Figure 21). Surrounding the active portion of the reactor, which contains fuel elements 78, is a hexagonal baffle 60 the lower end of which is seated in a hexagonal groove 62 in the plate 64 and the upper end of which is fixed within a similar groove 72 in the lower side of the plate 70. The manner in which the groove 62 is disposed on the plate 64 is shown in Figure 22 together with the apertures 66 which are triangular. Between the apertures 66 are smaller apertures 68 which are provided for passage of a coolant to be described below. On the side of the groove 62 opposite the apertures 66 and 68 there are a plurality of apertures 112. The apertures 112 are aligned with similar apertures 112 in the plates 70, 98, 100, and 102 in order to support a number of control rods 104. It is the purpose of the apertures 112 in the lower plate 64 to serve as a seat for the lower end of the rods 104 which extend to the top plate 102.

The reactor 54 is provided with a cooling system having an inlet 108 and an outlet 106. The inlet 108 communicates with a plurality of apertures 114 in the sheath 58, and the outlet 106 communicates with a plurality of apertures 110. By virtue of this construction the coolant, such as sodium (not shown, but whose direction of flow is indicated by arrows in Figure 1), enters through the apertures 114 and moves downwardly between the sheath 58 and the baffle 60. The coolant passes through the apertures 112 in the plate 64. For this purpose more apertures 112 exist than there are control rods 104. From this point the coolant rises through the apertures 68 (Figure 22) in the plate 64 and within the baffle 60. At the top of the baffle 60 the coolant passes through the apertures 74 which are not completely occupied by the fuel element 78, leaving the reactor 54 via the apertures 110. Part of the coolant also escapes to the region above the plates 98 and 100 creating a liquid head which attains a level that is dependent upon the pressure applied to the coolant.

The fuel elements 78 are elongated members having two ribs or fins 80 (Figures 23 and 24) spaced from each other by 120°. The ribs 80 extend longitudinally between plates 64 and 70 (Figure 1) when fuel element 78 is in the reactor. In order to insert and remove the elements 78 through the aligned apertures 74 in the plates 70, 98, 100, and 102, each aperture is provided with two peripheral notches 76 spaced 120° from each other, corresponding to the ribs 80. Figure 21 shows the manner in which the apertures 74 are disposed on each plate 70, 98, 100, and 102. It will be noted that the notches 76 for adjacent apertures 74 extend in different directions. The purpose of this pattern will be described below.

Figure 27:
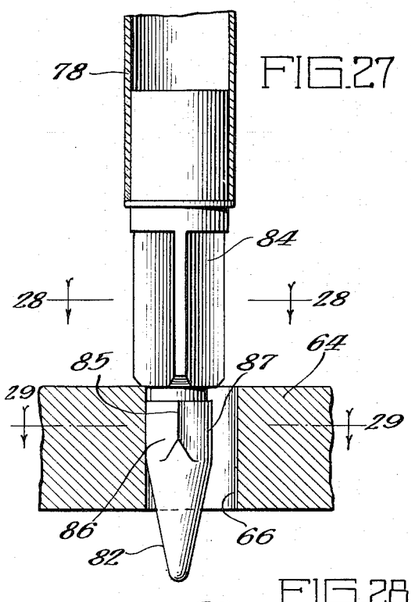
Figure 27 is an enlarged fragmentary elevational view, partly in section, of the lower end of the fuel element partially inserted into the bottom plate.
Figure 28:
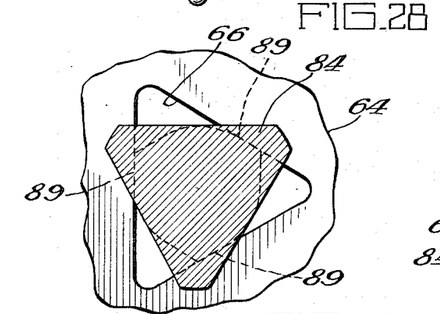
Figure 28 is an enlarged sectional view taken on the line 28—28 of Figure 27.
Figure 29:
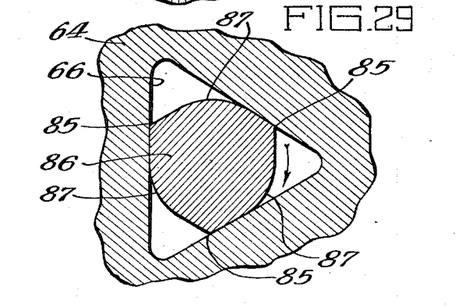
Figure 29 is an enlarged sectional view taken on the line 29—29 of Figure 27.
Figures 30, 31:
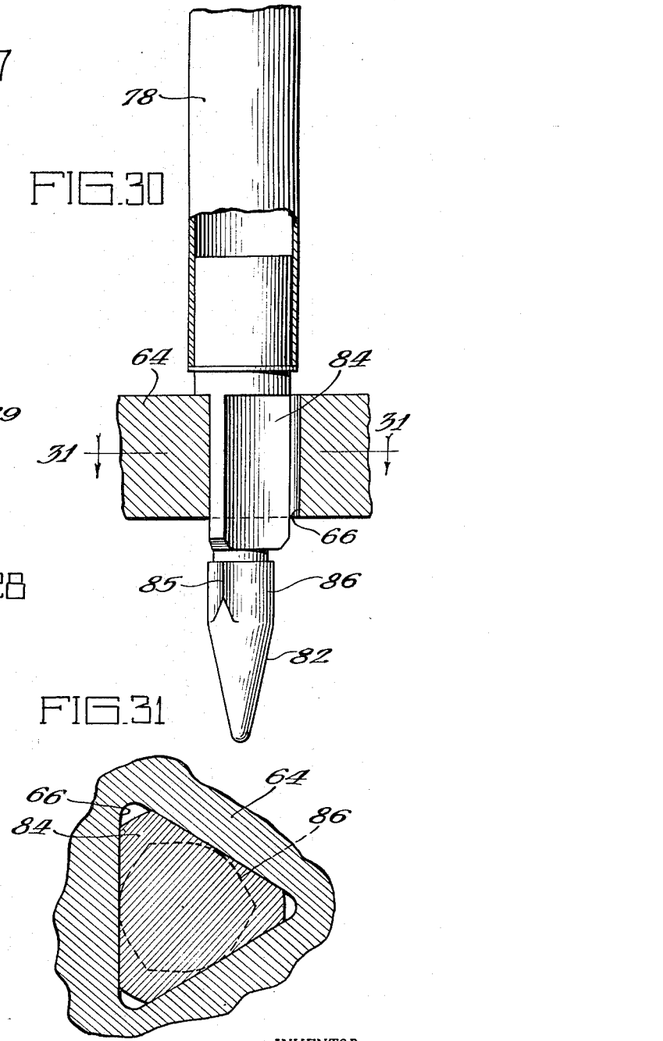
Figure 30 is an elevational view of the fuel element fully inserted into the bottom plate.
Figure 31 is an enlarged sectional view taken on the line 31—31 of Figure 30.

The lower end of the fuel element 78 (Figures 23 through 31) is provided with a tapered tip 82 (Figure 23) and a triangular segment 84 (Figure 26) adapted to fit the triangular aperture 66 of the bottom plate 64 (Figures 22, 30 and 31). Between the tapered tip 82 and the segment 84 of the element 78 is a segment 86 having a cross section with three corners 85 (Figures 27 and 29). Equally spaced between each corner 85 is a convex surface 87. All of these corners and surfaces are parallel to the longitudinal axis of the fuel element 78. In addition, the line of the convex surface 87, equidistant between each pair of corners 85, is flush with one of the sides of the triangular segment 84 (Figure 25). Between each corner 85 and each convex surface 87 is a flat surface 89 which extends at an angle of 30° to the corresponding side of the triangular segment 84. When the fuel element 78 is lowered into the aperture 66 of the plate 64 (Figure 27) the segment 86 fits snugly with three surfaces 89 in abutment with the walls of said aperture (Figure 28). Further lowering of the element 78 is impossible because the triangular segment 84 is not aligned with the aperture 66. In order to insert the triangular segment 84 into the triangular aperture 66 (Figure 30), the fuel element 78 must be rotated clockwise 30° (for this particular element), bringing the convex surfaces 87 into contact with the walls of the aperture 66. The triangular segment 84 is then aligned with the aperture 66 and lowered therein. Counterclockwise rotation is not possible because the corners 85 are adjacent said walls.

At the top of the fuel element 78 is a cap 88 (Figure 23) having a substantially rectangular cross section with rounded corners and a chamfered top surface 90. The cap 88 is adapted to fit into a rectangular socket 92 of a wrench 94. On two opposite sides of the socket 92 is disposed a pair of spring-biased clips 96 which adapt the wrench for easy attachment to the cap 88.

One of the purposes of the indexing mechanism 50 is to insert and withdraw the fuel elements 78 separately through their respective apertures 74 in the plates 70, 98, 100, and 102 in such manner as to permit passing of the ribs or fins 80 through the notches 76 of said apertures in an uninhibited manner. Due to the upper extension of the sheath 58 and the cover plate 57 over it, the position of the notches 76 is not evident to a person who is inserting the elements 78. For this reason the ribs 80 must be aligned with the notches 76 before lowering in order to protect the ribs from being damaged. The indexing mechanism 50 performs the alignment with positive certainty.

The second purpose of the mechanism 50 is to insure the proper rotation of the element 78 when the element is to be withdrawn from the reactor 54. When the element 78 is inserted to the position shown in Figure 27, it must be rotated 30° in the proper direction in order to completely insert the triangular segment 84 into the aperture 66 as shown in Figure 30. The purpose for such rotation is to place the ribs 80 in a position adjacent the contiguous fuel elements. During the period the fuel element 78 is in the reactor it is subjected to severe stresses due to relatively high temperatures of operation. These stresses may cause the elements to bend at their centers and contact adjacent fuel elements. The ribs 80 serve to prevent this bending beyond a given point of toleration which, if exceeded, would possibly cause the contacting fuel elements to weld together if the temperature of operation attains the welding temperature. As was explained above with respect to Figure 29, the fuel element 78 was described as being rotated clockwise in order for the element to be finally seated in the aperture 66 as shown in Figure 30. However, an adjacent fuel element 78 to the one shown in Figure 29 will be inserted in the aperture 66 so that the surface 89 on the other side of the corner 85 is in abutment with the walls of said aperture. It is then necessary to rotate the fuel element in the counterclockwise direction, rotation in the clockwise direction being inhibited by the corners 85 as was explained above. Accordingly a pattern of rotation has been established whereby adjacent fuel elements are rotated in opposite directions in order to properly dispose the ribs 80 between adjacent elements. As shown in Figure 2, upon insertion the fuel element 78 indicated by the letter "A" are rotated counterclockwise 30° and the elements indicated by the letter "B" are rotated clockwise 30°.

Upon the insertion of the fuel elements 78 to the position shown in Figure 27, the particular element may be easily rotated into place simply by trial and error. If the wrong direction is first selected nothing will happen because the corners 85 prevent rotation in which case the element need merely be rotated in the opposite direction.

When the element 78 is to be withdrawn from its position (Figure 2), the elements are not only bent due to the elevated temperature as described above, but it is possible that some of the ribs 80 have become welded to the adjacent element. These conditions make it impossible to select and feel the improper direction of rotation and thereafter select the proper one, the condition of the element 78 increasing the resistance to rotation. It is necessary therefore to select the proper direction of rotation in the first instance in order to overcome the added resistance involved. In addition it is necessary (Figure 2) to rotate the fuel element 78 in the direction opposite to that used for insertion, in order to realign the ribs 80 with their respective notches 76, and in order to prevent jamming of ribs of adjacent elements. The second purpose of the mechanism 50 is to insure the proper rotation upon withdrawal as was mentioned above.

Figure 4:
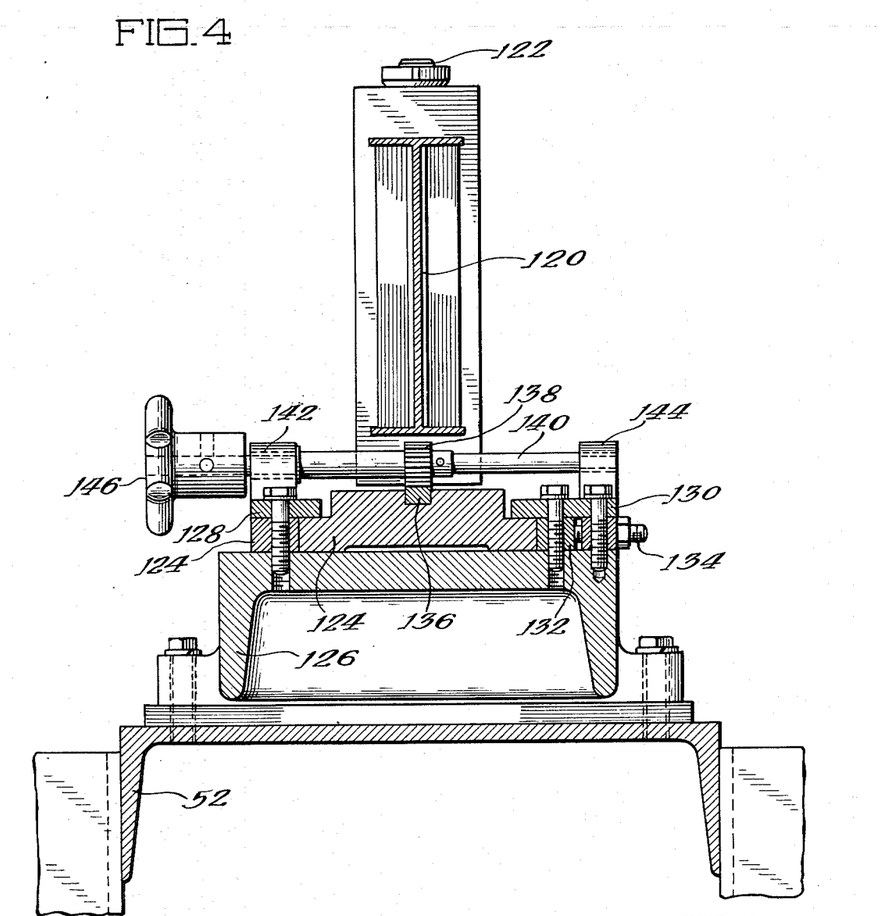
Figure 4 is a vertical sectional view, partly in elevation, taken on the line 4—4 of Figure 3.
Figures 5, 6:
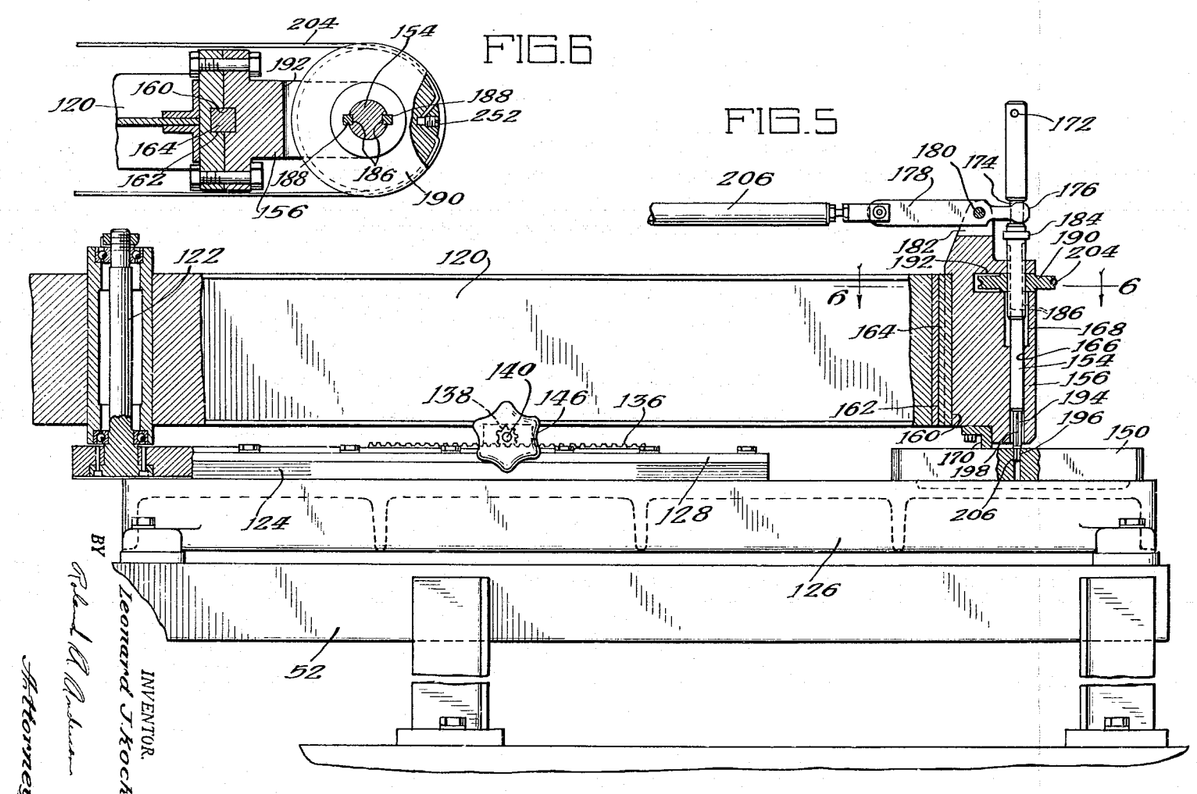
Figure 5 is an elevational view, partly in section, of that portion of the device shown in Figure 3.
Figure 6 is a horizontal sectional view, partly in elevation, of a pulley and cable taken on the line 6—6 of Figure 5.

The indexing mechanism 50 is primarily a first class lever which includes a horizontal I-beam 120 (Figure 1) centrally pivoted on a vertical pivot shaft 122. As shown in Figure 5, the lower end of the shaft 122 is secured to a member 124 that is slidably mounted on a base 126 rigidly affixed to the support stand 52. The member 124 (Figures 3 and 4) is sustained in place by means of a pair of conventional brackets 128 and 130 which are secured to the base 126 longitudinally thereof. The bracket 130 is provided with the usual adjustment means 132 including set-screws 134. In order to slide the member 124 longitudinally of the base 126, said member is provided with a rack 136 in its top surface. The rack is associated with a pinion 138 on a shaft 140 (Figures 3 and 4) which is rotatably mounted in a pair of blocks 142 and 144 on the top of the brackets 128 and 130, respectively. A hand knob 146 is secured on the end of the shaft 140 in order to actuate the assembly longitudinally of the base 126.

Figure 3:
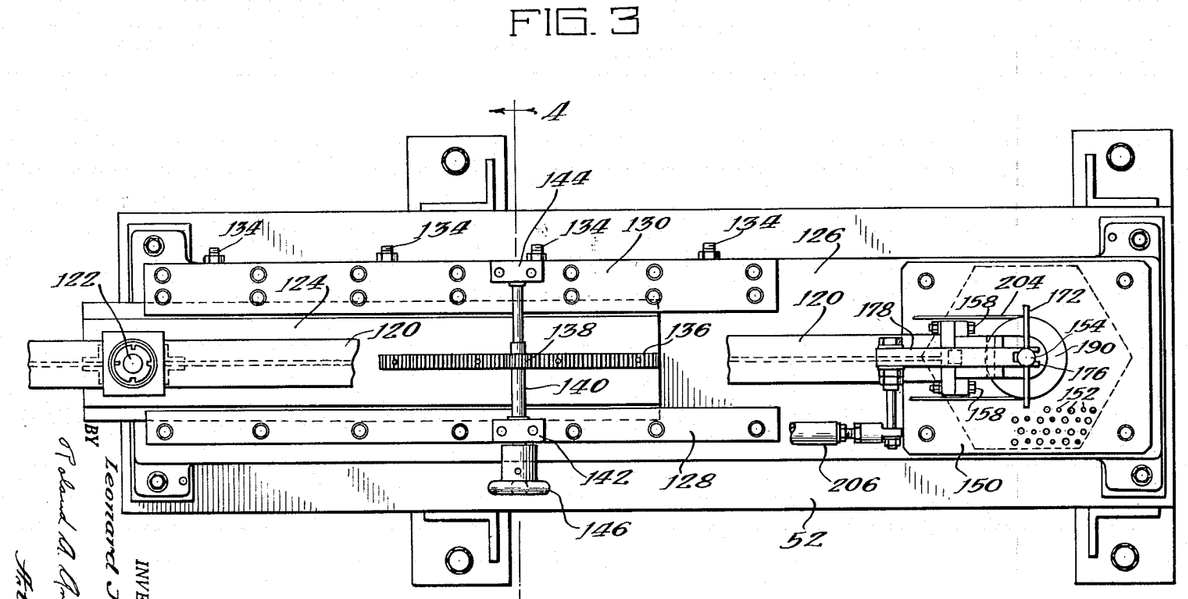
Figure 3 is a plan view of a portion of the device.

At the end of the base 126 remote from the shaft 122 is disposed an indexing plate 150 over which extends one end of the I-beam 120 (Figures 3 and 5). The plate 150 contains a plurality of apertures 152 having a pattern shown in Figure 20 which pattern corresponds to the positions of the apertures 74 and 66 in the plates 70 (Figure 21) and 64 (Figure 22), respectively. For the time being, the particular configuration of the apertures 152 will not be discussed but will be deferred to detailed description hereinbelow. Suffice it to say, the positions of the apertures 152 correspond to the positions of the fuel elements 78 within the reactor 54.

In Figure 5 the end of the I-beam 120 is provided with an index pin 154 mounted in a housing 156 that is bolted to the end of the beam 120 at 158 (Figures 1 and 3). In addition, the abutting surfaces of the housing 156 and the beam 120 have vertical keyways 160 and 162, respectively, (Figure 6) that are aligned to contain a key 164. This makes for greater rigidity of the assembly during its operation. The housing 156 is provided with a vertical bore 166 (Figure 5) the upper end of which is countersunk at 168 to be adapted for vertical and rotary movement of the pin 154 contained therein.

As is shown in Figure 5, the pin 154 is an elongated element vertically disposed over the indexing plate 150. By means of the pivotal movement of the beam 120 about the shaft 122, in addition to the longitudinal movement of said beam provided by the rack 136 and pinion 138, the pin 154 may be moved over and inserted into any aperture 152 in the plate 150. To facilitate the movement of the pin 154 over the surface of the plate 150 the lower end of the housing 156 is provided with a shoe 170 which is composed of a relatively soft bearing metal such as bronze. As shown in Figures 3 and 5, the top of the pin 154 is provided with a horizontal handle 172. Below this point (Figure 5) the pin 154 is provided with a necked portion 174 which is adapted to receive a bifurcated end 176 of a lever 178 which is pivoted on a pin 180 within a pair of vertical bifurcated members 182 integral with the housing 156. Below the necked portion 174 is an annular shoulder 184 which limits the downward movement of the pin 154. The segment of the pin 154 under the shoulder 184 has a diameter equal to that segment above the necked portion 174 and is provided with two vertical keyways 186 (Figures 5 and 6) oppositely disposed. These keyways receive a pair of corresponding keys 188 (Figure 6) which are secured to a pulley 190 horizontally disposed within a horizontal notch 192 within the housing 156 (Figure 5). Referring to Figure 5, the pin 154 has a reduced diameter below the keyways 186 which extends to a point near the lower end of said pin. The lower end of the pin is provided with two segments 194 and 196 (Figure 19), the latter one of which is lowermost. Each segment 194 and 196 is provided with aligned keys 198 and 200, respectively.

The significance of the foregoing description of the pin 154 lies in the purpose for which it is used. In this regard reference is made to Figure 20 which is an enlarged fragmentary view of the indexing plate 150 showing the pattern of the apertures 152. As was mentioned above, these apertures are not only disposed in parallel rows (so as to correspond with the distribution of the apertures 74 on the plate 70 as shown in Figure 21) but adjacent apertures in a key row have a different size. In short, there are two sizes of apertures 152, the smaller aperture being adapted to receive the end segment 196 of the pin 154 and the larger aperture being adapted to receive the larger segment 194 of said pin. In addition to the fact that each aperture 152 includes a keyway 202, the pin 154 must be rotated in order to insert the portion of the pin into its corresponding aperture 152 (Figure 19). It is evident, therefore, that the pin 154 is adapted to two degrees of movement, namely, vertical insertion into the apertures 152 and rotational movement about its longitudinal axis in order to align the keys 198 and 200 with the keyways 202. Rotation of the pin about its longitudinal axis causes the pulley 190 to turn which motion is transferred to a continuous cable 204 shown in Figures 1, 3, 6 and 7. The vertical motion of the pin 154 is transmitted to the lever 178. Accordingly, as shown in Figure 5, when the end segment 196 is inserted into a small aperture 152 to which it corresponds, the lever 178 is disposed in a horizontal position. Likewise, when the larger segment 194 is inserted into its corresponding aperture 152, the pin 154 will be disposed at a lower position causing the lever 178 to be inclined with its bifurcated end 176 below the pivot pin 180. Finally, when the pin 154 is entirely removed from the index plate 150, the lever 178 is disposed at another angle whereby the bifurcated end 176 is above the pivot point 180. These positions of the lever 178 are transmitted to the other end of the indexing mechanism 50 through a connecting rod 206 which is attached to the end of said lever remote from the bifurcated end 176 in a manner shown in Figure 3.

Figure 7:
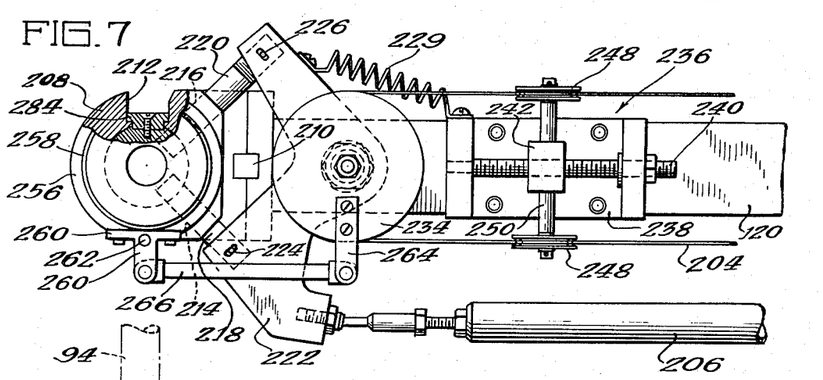
Figure 7 is a plan view, partly in section, of a portion of the device other than that portion shown in Figures 3 and 5.
Figure 8:
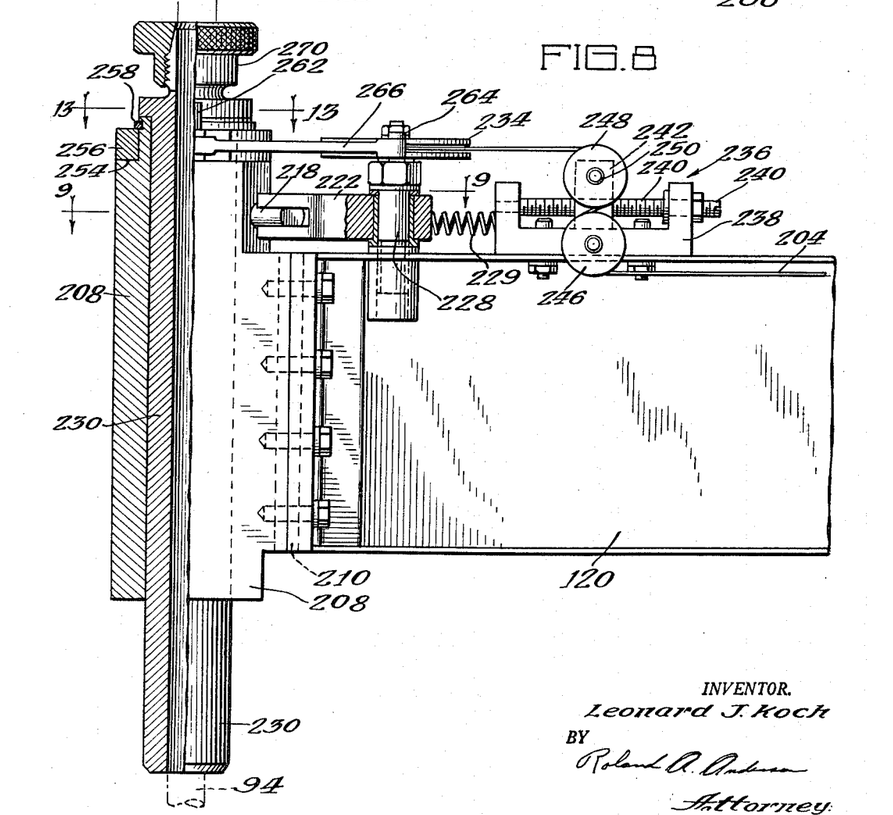
Figure 8 is an elevational view, partly in section, of the portion shown in Figure 7.
Figures 9, 13:
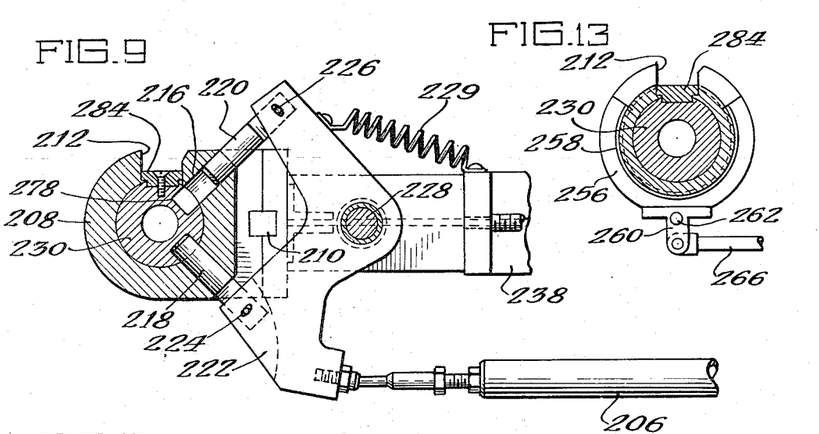
Figure 9 is a horizontal sectional view taken on the line 9—9 of Figure 8.
Figure 13 is a horizontal sectional view taken on the line 13—13 of Figure 8.

Having considered the assembly at the end of the lever 120, which is associated with the indexing plate 150, there remains for consideration the parts disposed at the opposite end. For this purpose, reference is made to Figures 7 through 29. In particular, attention is directed to Figures 7 and 8 in which is shown a sleeve 208 bolted to the lever 120. The sleeve 208 is keyed to the lever 120 by a key 210 (Figure 7) in a manner similar to that of the housing 156 (Figure 6). Being disposed about a vertical axis, the sleeve 208 has a longitudinal opening 212 on one side as shown in Figure 7. In addition, a pair of slots 214 and 216 are disposed through the sleeve 208 substantially normal to the longitudinal axis thereof. These are more clearly shown in Figures 9 and 10. In the slots 214 and 216 are disposed a pair of slidable dowel pins 218 and 220, respectively. Simultaneous movement of the dowel pins 218 and 220 is achieved by means of a bell crank 222 to which the pins 218 and 220 are pivotally attached at 224 and 226, respectively. As shown in Figure 8, the bell crank 222 is pivoted to a post 228 extending vertically from the center of the upper surface of the I-beam 120 and into which the lower end of the post is embedded. Referring to Figure 7, the connecting rod 206 is secured to the bell crank 222 by conventional means. Consequently, when the index pin 154 is disposed in the position shown in Figure 5, the lever 178, being in a horizontal position, extends the connecting rod 206 as far as possible toward the opposite end of the device. This causes the bell crank 222 to be rotated clockwise about the post 228 as far as possible, thrusting the dowel pin 218 beyond the inner surface of the sleeve 208 toward the longitudinal axis thereof (Figure 9). Likewise, when the index pin 154 is inserted into one of the larger apertures 152 of the indexing plate 150, the lever 178 is disposed at its greatest angle to the horizontal. This position of the pin 154 draws the connecting rod 206 toward the indexing end of the lever or I-beam 120 producing the results shown in Figure 10. That is the bell crank 222 is rotated counterclockwise as far as possible, thrusting the dowel pin 220 toward the longitudinal axis of the sleeve 208 and beyond the inner surface of said sleeve. Finally, when the index pin 154 is completely removed from the indexing plate 150, the lever 178 is disposed at an angle to the horizontal in the opposite direction which angle is less than that produced when the pin is inserted into a larger aperture 152. In this position, the connecting rod 206 turns the bell crank 222 to a neutral position (not shown in the drawings) in which case the free ends of the dowel pins 218 and 220 are completely contained within their corresponding slots 214 and 216. For this purpose, a tension spring 229 is attached to one side of the bell crank 222 at one end and to the I-beam 120 at the other end.

The foregoing description including the vertical movement of the index pin 154 together with the associated members indicates that the connecting rod 206, the bell crank 222, and the dowel pins 218 and 220 are adapted to be used only with regard to a bushing 230 which is shown in Figures 7 through 18 and which will be described in detail hereinbelow. The sleeve 208 is also adapted to receive a bearing 232 (Figures 32 through 35) which functions independently of the bushing 230 and the parts pertinent thereto. The purpose of the bearing 232 is strictly for insertion of fuel elements 78 into position in the reactor 54 while the purpose of the bushing 230 is primarily for removal of fuel elements. The bearing 232 is actuated by the rotational movement of the pin 154 (Figure 5) which motion is transmitted through the pulley 190 and cable 204 to the end of the lever 120 opposite said pin.

Referring to Figures 7 and 8, a pulley 234 is mounted on the post 228 above the bell crank 222. The pulley 234 functions with the pulley 190 at the opposite end of the mechanism by means of the cable 204. Being disposed at a higher level than the pulley 190, the pulley 234 is provided with a pulley guide generally indicated at 236. The guide 236 includes a mounting bracket 238 bolted to the top of the I-beam 120. Extending between the upright ends of the bracket 238 is a tightening screw 240 which extends through a pillow block 242. A pair of pulleys 246 are mounted on the bracket 238 on either side thereof. Another pair of pulleys 248 is mounted on a shaft 250 extending through the pillow block 242. By virtue of the pulley guide 236, the cable 204, which is disposed over the pulleys 246 and 248, may be adjusted for tautness. As shown in Figure 6, the cable 204 is fixed in position over the pulley 190 by means of a set-screw 252. A similar arrangement is provided for the pulley 234.

Figure 11:
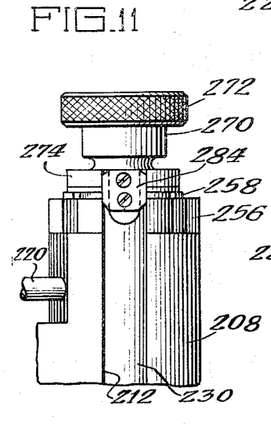
Figure 11 is a fragmentary elevational view of a portion of the device shown in Figure 8 but from the reverse side and showing a bushing completely inserted within a sleeve.
Figure 12:
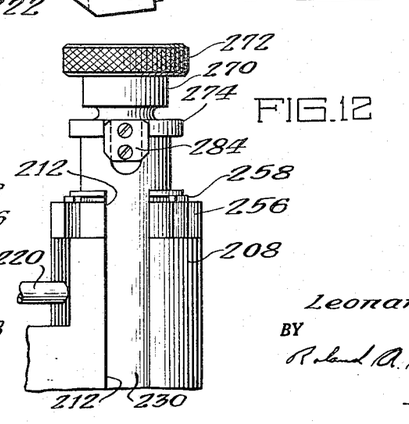
Figure 12 is a fragmentary elevational view of the portion of the device of Figure 11 with members in a different position.

In Figure 8, the sleeve 208 is provided with a shoulder 254 at the top thereof into which fits an open collar 256 which is rotatably mounted thereon and retained in place by means of a retaining ring 258. It is pointed out that the collar 256 is open on the side opposite that shown in Figure 8 in order to provide for the longitudinal opening 212 in the sleeve 208 as shown in Figures 11 and 12. On the side of the collar 256 opposite the opening a clevis 260 is mounted and extends horizontally therefrom. On the clevis 260 is disposed a vertical pin 262 (see Figure 34 also) which is adjacent the inner surface of the collar. As shown in Figure 7 an anchor 264 is mounted on the pulley 234 extending parallel to the clevis 260. The clevis 260 and the anchor 264 are joined by a clevis arm 266.

Figure 10:
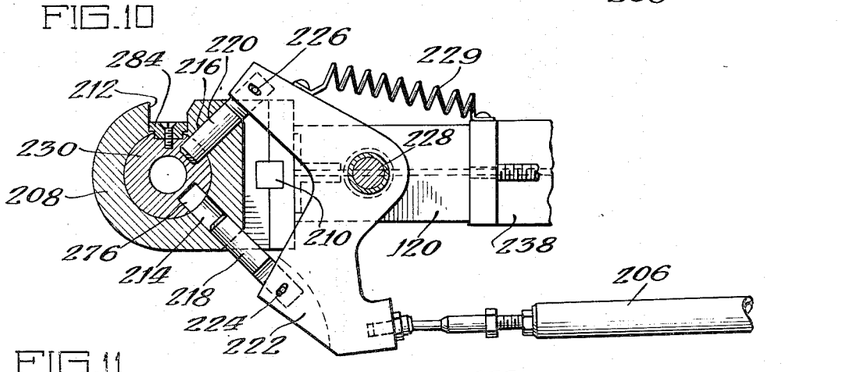
Figure 10 is a view of that portion of the device shown in Figure 9 in an alternate position.
Figure 14:
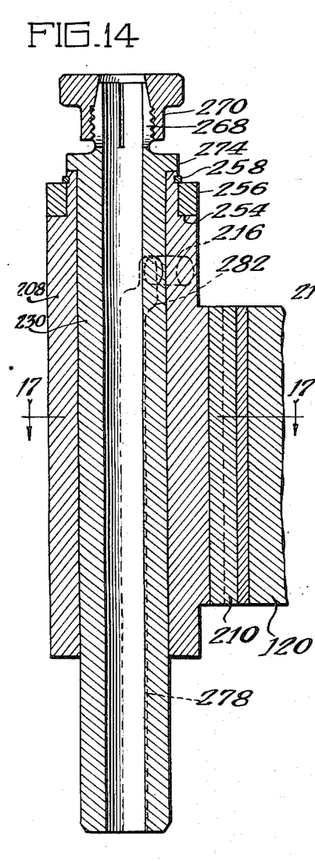
Figure 14 is a vertical sectional view of the bushing in the sleeve of Figure 11 and associated members.
Figures 15, 16:
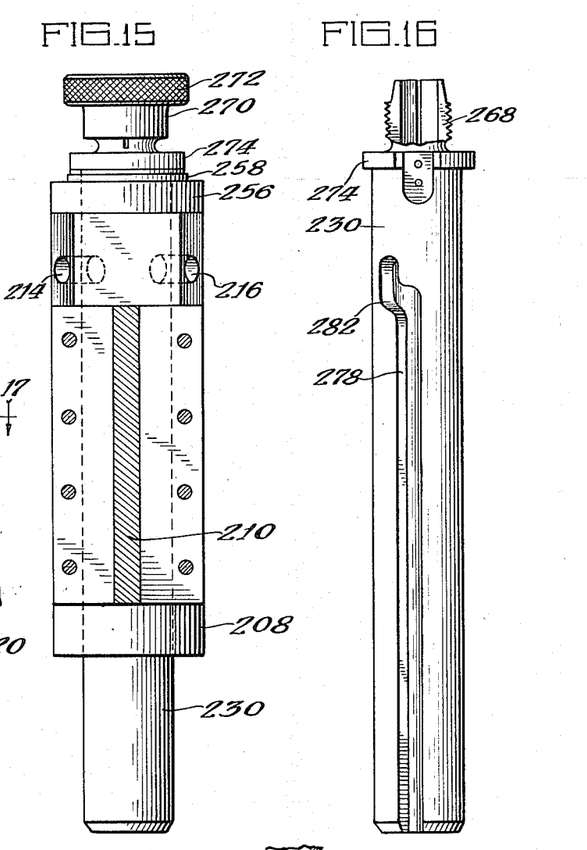
Figure 15 is an end elevational view of the device shown in Figure 14.
Figure 16 is an elevational view of the bushing of Figure 15.
Figures 17, 18:
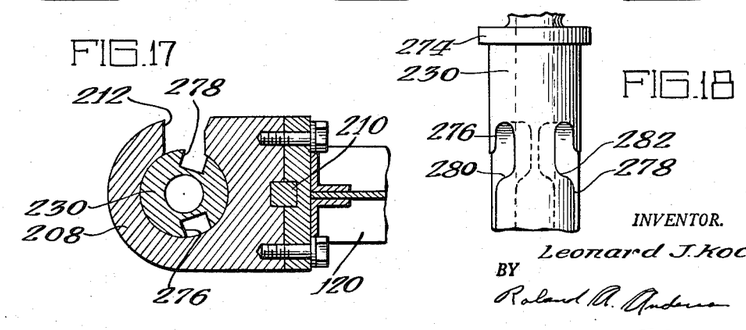
Figure 17 is a horizontal sectional view taken on the line 17—17 of Figure 14.
Figure 18 is a fragmentary side view of the bushing of Figure 16 showing the upper extremities of its two external surface channels.

As was mentioned above, the bushing 230 (Figures 7 through 18) and the bearing 232 (Figures 32 through 35) are used interchangeably in the sleeve 208. Considering first the bushing 230, it is an elongated cylindrical body as shown in Figures 14 and 16. The upper end of the bushing 230 is split at 268 and is provided with a nut 270. The split sleeve 268 is integral with the bushing. In order to facilitate tightening, the nut 270 is provided with a knurled surface 272. Below the clamp is a flange 274 which rests upon the upper end of the sleeve 208 when the bushing 230 is completely inserted therein. The external surface of the bushing 230 contains a pair of channels 276 and 278 which, as shown in Figures 14 and 16, extend substantially longitudinally of the bushing, extending from the lower end of the bushing to a point near the top. The channels 276 and 278 are provided with converging bends 280 and 282, respectively, as shown in Figure 18. In addition, as shown in Figures 9 through 12, a guide stop 284 is secured to the external surface of the bushing 230 adjacent the flange 274. The guide stop 284 is adapted to fit into the top of the opening or channel 212 (Figure 11) in order to align the channels 276 and 278 with the slots 214 and 216 in the sleeve 208 (Figures 9 and 10). Hence, when either dowel pin 218 or 220 is extended into its corresponding channel 276 or 278, the bushing 230 may be removed from the sleeve 208 by raising it for a short distance equal to the short longitudinal segment of the channel 276 or 278 and then rotating the bushing in the proper direction permitted by either bend 280 or 282, followed by further raising until the corresponding dowel pin passes through the lower end of the channel. It is pointed out that the dowel pins 218 and 220 operate separately and at no time are both pins extended into their corresponding channels 276 and 278 simultaneously.

It is to be emphasized that the bushing 230 operates in conjunction with the dowel pins 218 and 220 together with the bell crank 222 to which they are attached. The open collar 256 together with its associated members including the pin 262 and the pulley 234 (Figure 7) have no functional utility when the bushing 230 is being used in the sleeve 208.

*Operation*

When the bushing 230 is being used, connection between the indexing mechanism 50 and the fuel rods 78 (Figure 1) is made by means of the elongated wrench 94 which was previously alluded to with regard to Figure 23. The lower end of the wrench 94 is provided with the rectangular socket 92 and spring clips 96 whereby the fuel elements 78 may be rotated and raised from their positions within the reactor 54 when necessary. Accordingly, whenever a fuel element is to be removed from the reactor 54, the wrench 94 is placed within the bushing 230 without tightening the nut 270 and a segment of the wrench is passed through the opening or channel 212 into the sleeve 208. The wrench 94 is then lowered into the reactor (Figure 1) through the plates 102, 100 and 98 until the socket 92 at the lower end thereof is fitted over the cap 88 at the top of the fuel element 78. The particular fuel element selected has been previously chosen by inserting the index pin 154 into the corresponding aperture 152 in the index plate 150. The clamp on the bushing 230 is then tightened on the wrench 94 by turning the nut 270 down on the split sleeve 268. The wrench 94 is then raised through the distance equal to the top segment of either channel 276 or 278 (Figure 18). This distance is equal to the distance necessary to remove the triangular cross section 84 at the lower end of the fuel element 78 (Figure 23) from the triangular aperture 66 in the bottom plate 64. At this juncture, the fuel element 78 may be rotated through a distance of 30° in order to turn the ribs or fins 80 from the positions shown in Figure 2 to a position of alignment with the corresponding notches 76 in the aperture 74 of the shield plate 70. The operators of the mechanism need not guess which direction to turn the fuel element 78, because the particular fuel element has been selected by inserting the index pin 154 into the aperture 152 at the same time the corresponding dowel pin has been extended into its associated channel 276 or 278. For example, assume arbitrarily that the pin 154 has been inserted into one of the larger apertures 152 causing the dowel pin 220 to be thrust into the channel 278 as shown in Figure 10. It is then possible to rotate the wrench 94 and the bushing 230 only through the bend 282 (Figure 16) whereby the ribs or fins 80 are aligned with the notches 76. The wrench is then raised until the dowel pin 220 passes through the lower end of the channel 278 at which point the wrench is further raised until the lower end of the fuel element clears the shield plate 102. If desirable, after the lower end of the bushing 230 has cleared the top of the sleeve 208, the mechanism 50 may be rotated about the pivot shaft 122 causing the opening or channel 212 in the sleeve to pass the wrench 94.

Correspondence between the indexing plate 150 and the shield plate 70 is a primary requisite. A comparison of the apertures 74 on plate 70 with the apertures 152 on the plate 150 is fundamental to the understanding of the manner in which the mechanism 50 dictates the direction of rotation of adjacent fuel elements 78. Thus, in Figure 2 the apertures 74 having elements 78 arbitrarily denoted by "A" have notches 76 disposed (for purposes of immediate explanation) on the lower right- and left-hand sides thereof. This fact corresponds with Figure 20 in which the apertures 152 denoted "A" on the indexing plate 150 are similar in size and in association with respect to each other. A similarity of size of the apertures 152, ignoring for the time being the disposition of the keyways 202, is the feature which dictates the direction of rotation of the fuel elements. As was explained above, the difference in size of the apertures 152 denoted "A," as distinguished from the apertures denoted "B," is the feature which determines the direction in which fuel elements will be rotated. Consequently, a fuel element inserted into an aperturre 74 in the plate 98 (Figure 2) denoted "A" will be rotated counterclockwise upon insertion therein, while a fuel element inserted into an aperture 74 denoted "B" will be rotated clockwise yielding the particular disposition of the fins or ribs 80 between adjacent fuel elements as shown.

As shown in Figures 32 through 35, the bearing 232 is a cylindrical body having an outside diameter equal to that of the bushing 230. At the top of the bearing 232 is a flange 286 which rests upon the top of the sleeve 208 when fully inserted therein. Since the inside diameter of the bearing 232 is adapted to receive the fuel element 78, the bearing 232 is composed of two halves, namely, the portions 288 and 290 which have abutting interfaces at the line 292. The portion 288 includes a pair of furrows 294 in the inside surface thereof which are spaced 120° from each other. Before the bearing 232 is placed into the sleeve 208, the particular fuel element 78 to be inserted is placed into the central bore with the fins 80 disposed in the furrows 294. The assembly is then placed into the sleeve 208, and is ready for insertion into the reactor. There remains, however, the task of aligning the ribs or fins 80 with the notches 76 in the apertures 74 of the shield plate 70 which are out of sight of the operator. For this purpose, a peripheral notch 296 (Figures 34 and 35) is disposed in the flange 286 to receive the pin 262. By virtue of this connection, when the index pin 154 is rotated (Figure 19) in order to align either key 198 or 200 with its associated keyway 202 in the indexing plate 150, the rotation of the pin is transmitted to the pulleys 190 and 234 via the cable 204 and throught he associated connecting members (264, 266 and 260) to the collar 256 which rotates freely upon the shoulder 254 of the sleeve 208. This movement in turn is transmitted through the pin 262 to the flange 286 causing the furrows 294 to be aligned with the notches 76 in the shielding plate 70.

Figure 32:
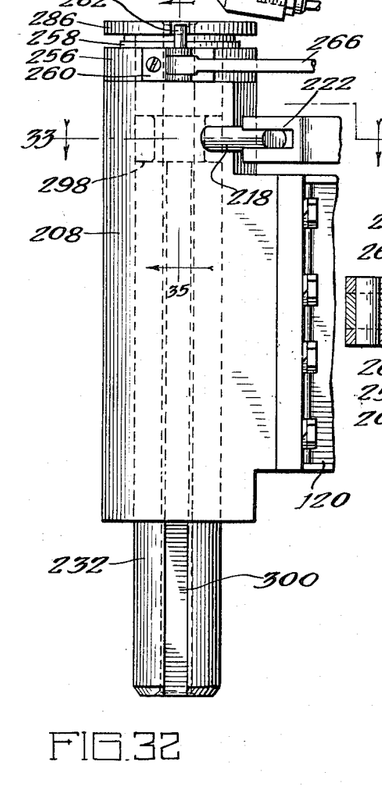
Figure 32 is a fragmentary elevational view of the sleeve containing the bearing shown in Figure 8.
Figure 33:
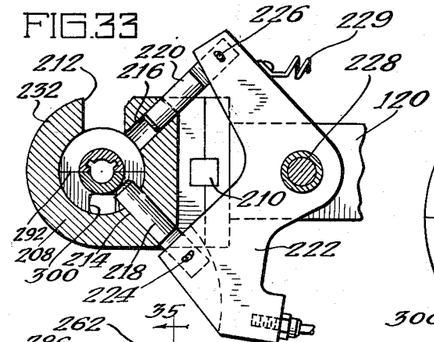
Figure 33 is a horizontal sectional view, partly in elevation, taken on the line 33—33 of Figure 32.
Figure 34:
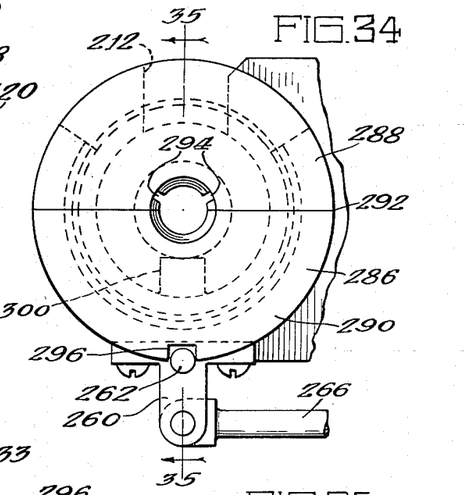
Figure 34 is a fragmentary enlarged plan view of the portion of the device shown in Figure 32.
Figure 35:
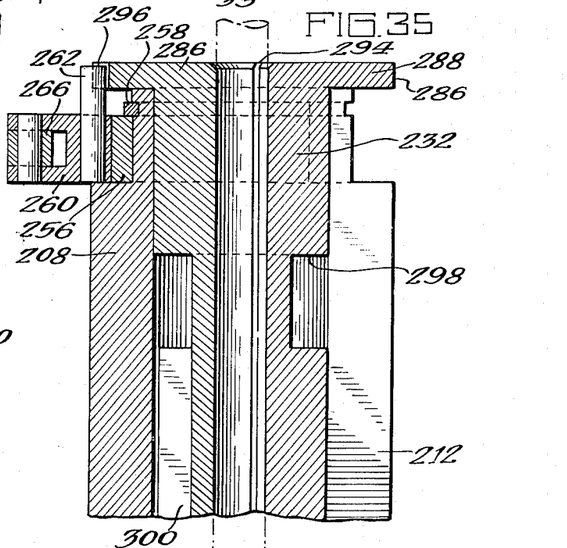
Figure 35 is an enlarged vertical sectional view of the bearing in the sleeve taken on the line 35—35 of Figures 32 and 34.

The fact that the index pin 154 is moved vertically in this operation as well as being rotated, is immaterial even though either dowel pin 218 or 220 is actuated into or out of position as set forth above (Figure 33). At the level of the dowel pins, the bearing 232 is provided with an annular rabbet 298, as shown in Figures 32 and 35, which fact renders inoperative the position of the dowel pins, because the bearing may be rotated without interference due to the rabbet 298. In addition, a vertical channel 300 is provided on the outer surface of the bearing 232 which extends from the lower end and which communicates with the rabbet 298.

Unlike the bushing 230 the wrench 94 is not used with the bearing 232; rather, as was explained above, the fuel elements 78 are separately placed into the bearing 232 and the index pin 154 is inserted into the desired aperture 152 in the indexing plate 150. By this insertion the bearing 232 is rotated so as to align the fins or ribs 80 with the unseen notches 76 in the plates 70, 98, 100, and 102. The fuel element is then permitted to drop into place until the lower end of the triangular cross section 84 (Figure 23) contacts the top surface of the bottom plate 64. At this point the operator rotates the fuel element in the direction of least resistance until the triangular segment 84 drops into the triangular aperture 66 in the bottom plate 64.

It will be understood that the invention is not limited to the specific embodiment disclosed, inasmuch as other embodiments thereof will be readily apparent to those skilled in the art without departing from the spirit of the invention or the scope of the claims.

What is claimed is:

1. A device comprising a base, a lever pivotally attached to the base, an indexing plate on the base parallel to the plane of lever rotation and having a plurality of apertures, the apertures being disposed in rows, each aperture having a keyway, the keyways in adjacent apertures being disposed in different directions, an index pin movably disposed on the lever normal to said plane of rotation, a key on the pin, a sleeve on the lever spaced from and parallel to the index pin, a first pulley on the index pin, a second pulley on the lever adjacent the sleeve, a cable disposed between the pulleys, an open collar rotatably attached to the sleeve and linked to the second pulley, a pin extending from the collar, and a bearing movably mounted in the sleeve and having at least two longitudinal grooves in the outside surface, the bearing having a notch adapted to receive the pin on the collar.

2. A device comprising a horizontal base, a first class lever pivotally attached to the base, an indexing plate on the base parallel to the plane of lever rotation and having a plurality of apertures, the apertures being disposed in parallel rows, each aperture having a keyway, the keyways of similar apertures in alternate rows being disposed in similar directions, a vertical index pin movably disposed at one end of the lever normal to the plane of rotation, a key on the pin, a vertical sleeve on the other end of the lever, a first pulley on the index pin, a second pulley on the lever adjacent the sleeve, a cable disposed between the pulleys, a collar rotatably attached to the sleeve and linked to the second pulley, a pin extending from the collar, a bearing movably mounted in the sleeve and having at least two longitudinal grooves on the outside surface, the bearing having a notch adapted to receive the pin on the collar.

3. A device comprising a base, a lever pivotally attached to the base, an index plate on the base parallel to the plane of lever rotation and having a plurality of apertures, each aperture having one of at least two diameters, the apertures being disposed in parallel rows, alternate apertures in each row having the same diameter, an index pin movably disposed on the lever normal to said plane of rotation, the index pin being adapted to be inserted into adjacent apertures at different positions there being at least two such positions, a sleeve on the lever spaced from and parallel to the index pin, the sleeve having a number of slots therethrough substantially normal to the longitudinal axis thereof, a dowel pin slidably disposed in each slot, a connecting rod operatively linking the index pin at one end to the dowel pins at the other end, a bushing movably mounted in the sleeve and having a number of external surface channels extending substantially longitudinal with a tortuous segment therein, the number of channels and slots being equal to the number of positions of the index pin, each channel being associated with one dowel pin, and a split sleeve and nut clamp at one end of the bushing, whereby insertion of the index pin into an aperture moves a corresponding dowel pin into its associated channel.

4. A device comprising a horizontal base, a first class lever pivotally attached to the base, an indexing plate on the base parallel to the plane of lever rotation and having a plurality of apertures, each aperture having one of at least two diameters with apertures of different diameters being adjacent, the apertures being disposed in parallel rows with alternate apertures in each row having the same diameter, each aperture having a keyway, the keyways in adjacent apertures being disposed in different directions, a vertical index pin slidably disposed at one end of the lever over the plate, the pin having an end segment with a diameter equal to the smallest aperture and also having adjacent said end segment a segment with a diameter equal to the next smallest aperture, a key on the pin extending from each segment, a vertical sleeve on the other end of the lever spaced from the index pin, a first pulley on the index pin, a second pulley on the lever adjacent the sleeve, a cable disposed between the pulleys, an open collar rotatably attached to the sleeve and linked to the second pulley, and a pin in the collar.

5. A device comprising a base, a lever pivotally attached to the base, an indexing plate on the base parallel to the plane of lever rotation and having a plurality of apertures, each aperture having one of at least two diameters with apertures of different diameters being adjacent, the apertures being disposed in parallel rows with alternate apertures in each row having the same diameter, each aperture having a keyway, the keyways in adjacent apertures being disposed in different directions, an index pin movably disposed on the lever normal to said plane of rotation, the pin having an end segment with a diameter equal to the smallest aperture and also having adjacent the end segment a segment with a diameter equal to the next smallest aperture, a key on the pin extending from each segment, a sleeve on the lever spaced from and parallel to the index pin, the sleeve having a number of slots therethrough substantially normal to the longitudinal axis thereof, a dowel pin slidably disposed in each slot, and a connecting rod operatively linking the index pin at one end to the dowel pins at the other end.

6. A device comprising a base, a lever pivotally attached to the base, an indexing plate on the base parallel to the plane of lever rotation and having a plurality of apertures, each aperture having one of at least two diameters with apertures of different diameters being adjacent, the apertures being disposed in parallel rows with alternate apertures in each row having the same diameter, each aperture having a keyway, the keyways in adjacent apertures being disposed in different directions, an index pin movably disposed on the lever normal to said plane of rotation, the pin having an end segment with a diameter equal to the smallest aperture and also having adjacent the end segment a segment with a diameter equal to the next smallest aperture, a key on the pin extending from each segment, a sleeve on the lever spaced from and parallel to the index pin, the sleeve having a number of slots therethrough substantially normal to the longitudinal axis thereof, a dowel pin slidably disposed in each slot, a connecting rod operatively linking the index pin at one end to the dowel pins at the other end, a first pulley on the index pin, a second pulley on the lever adjacent the sleeve, a cable disposed between the pulleys, an open collar rotatably attached to the sleeve and linked to the second pulley.

7. A device comprising a horizontal base, a first class lever pivotally attached to the base, an indexing plate on the base parallel to the plane of lever rotation and having a plurality of apertures, each aperture having one of at least two diameters with apertures of different diameters being adjacent, the apertures being disposed in parallel rows with alternate apertures in each row having the same diameter, each aperture having a keyway, the keyways in adjacent apertures being disposed in different directions, a vertical index pin slidably disposed at one end of the lever over the plate, the pin having an end segment with a diameter equal to the smallest aperture and also having adjacent said end segment a segment with a diameter equal to the next smallest aperture, a key on the pin extending from each segment, a vertical sleeve at the other end of the lever, the sleeve having two slots therethrough substantially normal to the axis thereof, a dowel pin slidably disposed therein, a bell crank attached to the dowel pins, a connecting rod operatively linking the index pin at one end to the bell crank at the other end, a first pulley on the index pin, a second pulley on the lever adjacent the sleeve, a cable disposed between the pulleys, an open collar rotatably attached to the sleeve and linked to the second pulley, and a pin extending from the collar.

8. A device comprising a horizontal base, a first class lever pivotally attached to the base, an indexing plate on the base parallel to the plane of lever rotation and having a plurality of apertures, each aperture having one of at least two diameters with apertures of different diameters being adjacent, the apertures being disposed in parallel rows with alternate apertures in each row having the same diameter, each aperture having a keyway, the keyways in adjacent apertures being disposed in different directions, a vertical index pin slidably disposed at one end of the lever over the plate, the pin having an end segment with a diameter equal to the smallest aperture and also having adjacent said end segment a segment with a diameter equal to the next smallest aperture, a key on the pin extending from each segment, a vertical sleeve at the other end of the lever, the sleeve having two slots therethrough substantially normal to the axis thereof, a dowel pin in each slot slidably disposed therein, a bell crank attached to the dowel pins, a connecting rod operatively linking the index pin at one end to the bell crank at the other end, a hollow cylinder within the sleeve and having two longitudinal grooves, each dowel pin being aligned with and alternately slidable therein, a portion of each groove being offset in opposite directions, a rod-grasping means attached to said cylinder, a first pulley on the index pin, a second pulley on the lever adjacent the sleeve, a cable disposed between the pulleys, an open collar rotatably attached to the sleeve and linked to the second pulley, and a pin extending from the collar.

(References on following page)

References Cited in the file of this patent

UNITED STATES PATENTS

| | | |
|---|---|---|
| 192,907 | Ellinwood | July 10, 1877 |
| 724,338 | Sedivy | Mar. 31, 1903 |
| 942,571 | Leland | Dec. 7, 1909 |
| 1,059,271 | Buchnam | Apr. 15, 1913 |
| 1,803,458 | Berry | May 5, 1931 |
| 2,283,064 | Hillbrand | May 12, 1942 |
| 2,424,153 | Curtis et al. | July 15, 1947 |